Patented Jan. 3, 1950

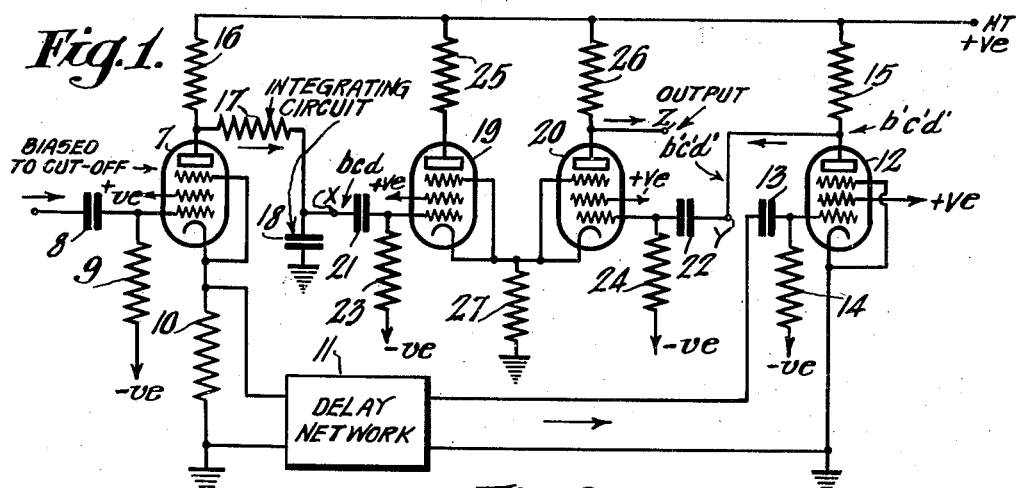
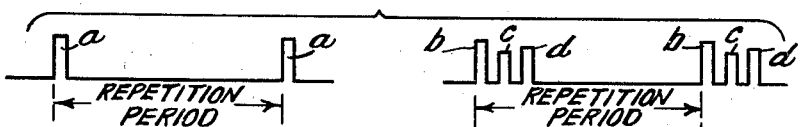
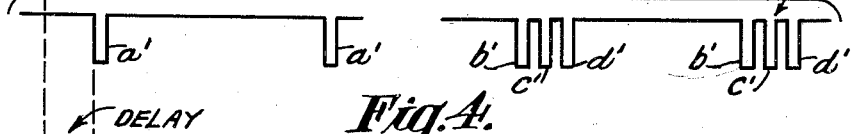
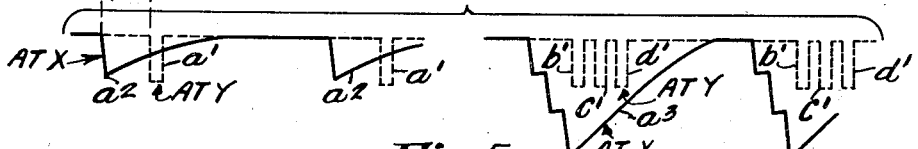
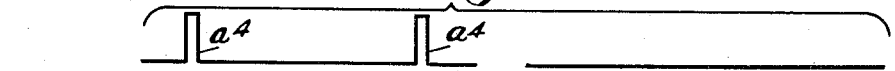

2,493,648

UNITED STATES PATENT OFFICE 2,493,648

ELECTRICAL PULSE SEPARATING CIRCUITS

Walter Leslie Watton, Hayes, Eric William Bull, Hounslow, and Eric Lawrence Casling White, Iver, England, assignors to Electric and Musical Industries, Limited, a British corporation Application June 2, 1945, Serial No. 597,256
In Great Britain December 24, 1943

Section 1, Public Law 690, August 8, 1946
Patent expires December 24, 1963

3 Claims. (Cl. 250—27)

This invention relates to electrical pulse-separating circuits.

In electrical apparatus it may be required to discriminate between regularly repeating pulses and a regularly repeating series of pulses. Each of the pulses in the series may be fairly closely spaced and may fluctuate in amplitude and phase. For example, in apparatus for detecting the presence of aircraft of the kind in which pulses of radio frequency energy are transmitted at regular intervals, pulses will be received at the receiver on reflection by aircraft, such pulses being single pulses where only one aircraft is causing reflection and being in the form of a series of pulses fairly closely spaced when a flight of aircraft is causing reflection. In such apparatus, it may be desired to provide means for separating the single pulses from a series of pulses so as to be able to detect when only a single aircraft is in the range of the transmitter or when a plurality of aircraft are in range. In other electrical apparatus it may also be desired to be able to separate from a mixture of pulses of different widths those pulses having a predetermined narrow width.

The object of the present invention is to provide a circuit arrangement for the purpose of separating single pulses and a series of pulses or for separating narrow pulses and wide pulses.

According to the invention there is provided a pulse-separating circuit for separating single pulses and a series of pulses or for separating narrow and wide pulses comprising a main channel and an observing channel arranged to receive the pulses requiring separation, said main channel having means for delaying pulses fed therethrough and said observing channel having means arranged to develop derived pulses from single or narrow pulses which are different from derived pulses developed from a wide pulse or a series of pulses, means being provided for utilizing said derived pulses to control the transmission of pulses in said main channel so as to separate said single and said series of pulses or said narrow and wide pulses. Preferably, the observing channel is arranged to develop from said single or narrow pulses derived pulses of smaller amplitude compared with derived pulses developed from a wide pulse or a series of pulses.

Whilst the invention can be employed to provide an output from the main channel of a series of pulses or a wide pulse, the present invention, however, is primarily concerned with separating a single pulse from a series of pulses or a narrow pulse from wide pulses. In this case, the derived pulses and the pulses which pass through the main channel are preferably applied respectively to the control electrodes of a pair of valves arranged in push-pull and having a common cathode impedance, the arrangement being such that when a derived pulse of small amplitude is fed to one of said valves an output of a single or narrow pulse from the main channel is afforded, whilst when a derived pulse of large amplitude is fed to one of said valves, no output from the main channel is afforded. The observing channel may comprise an integrating circuit for developing said derived pulses of different amplitudes or where it is required that the observing channel should afford derived pulses independently of the width of the applied pulses, the observing channel may include a storage device through which the pulses in the observing channel are fed to a unilaterally-conducting device which is arranged to conduct when a pulse is present in said observing channel and to cause a charge to be stored in a further storage device, a further unilaterally-conducting device being provided arranged to discharge said first-mentioned storage device when said pulse ceases.

In order that the said invention may be clearly understood and readily carried into effect, it will now be more fully described with reference to the accompanying drawing in which:

Figure 1 is a circuit diagram illustrating an arrangement according to one form of the invention, Figure 2 is a graph that illustrates a typical form of pulses which may be applied to the circuit shown in Figure 1, Figures 3, 4 and 5 are graphs that illustrate the form of pulses appearing at different parts of the circuit of Figure 1, and Figure 6 is a circuit diagram illustrating a modified form of circuit for converting the pulses into derived pulses of different amplitudes.

The circuit shown in Figure 1 comprises a main channel and an observing channel to which the pulses requiring separation are fed. Typical forms of pulses which may require separation are shown in Figure 2 and may comprise single pulses $a$ or a series of pulses $b$, $c$ and $d$. Such typical pulses may, for example, be the received pulses at a receiver detecting the presence of aircraft, the pulse $a$ being received when a single aircraft is within the range of the transmitter and the series of pulses $b$, $c$ and $d$ being received when a flight of aircraft is within range.

The main channel includes a thermionic valve 7 to the control electrode of which the pulses which are required to be separated are applied through a condenser 8 and leak resistance 9. The cathode of the valve 7 is connected to earth through a resistance 10 so that the pulses which are applied to the control electrode of the valve 7 in a positive sense appear with the same polarity across the resistance 10. The pulses which appear across the resistance 10 are fed through a delay network 11 forming part of the main channel to a further valve 12 via a condenser 13 and leak resistance 14, the anode of the valve 12 being arranged to limit the amplitude of the pulses applied thereto from the delay network and to reverse their polarity so that at the point Y in the anode circuit of the valve, voltage pulses of the form shown in Figure 3 at $a'$, $b'$, $c'$ and $d'$ will be obtained, these pulses being similar to the original pulses but of constant amplitude and reversed polarity and delayed in time with respect to the applied pulses. The delay introduced by the network 11 should be such that the pulses shown in Figure 3 are delayed by a time slightly larger than the maximum interval between the pulses $b$ and $c$ of the series of pulses shown in Figure 2.

The anode of the valve 7 is connected to a source of anode current through a resistance 16 and the valve 7 is arranged so as to be non-conducting in the absence of applied pulses so that the anode of the valve 7 is normally at the potential of the source of anode current in the absence of applied pulses. The valve 7 is also included in an observing channel which includes an integrating circuit comprising a resistance 17 connected to the anode of valve 7 and a condenser 18, the condenser 18 being charged from the source of anode current when the valve 7 is non-conducting. When a pulse or a series of pulses is applied to the control electrode of the valve 7 causing the valve to conduct, the condenser 18 is discharged through the valve 7 and the resistance 17 in series and when the pulse or the series of pulses ceases, the condenser 18 again charges through the resistances 16 and 17. The time constant of the resistances 16, 17 and the condenser 18 is of such a length that the condenser 18 attains the full potential of the source of anode current in the repetition period of the pulses.

The integrating circuit converts the single pulses $a$ into derived pulses which appear at the point X in Figure 1, of the form shown at $a^2$ in Figure 4 and of negative sign and of an amplitude which is arranged to be less than the amplitude of the delayed pulses appearing at the point Y in Figure 1. The amplitude of the pulses $a^2$ is controlled by the time constant of the constant of the condenser 18 and resistance 17. When a series of pulses, such as the pulses $b$, $c$ and $d$ are applied to the valve 7, derived pulses $a^3$ appear at the point X of Figure 1, these pulses $a^3$ being due to the functioning of the integrating circuits of larger amplitude than the derived pulses $a^2$, and being proportional to the number of consecutive pulses applied. The pulses appearing at the point Y in Figure 1 are shown superimposed in dotted lines on the pulses $a^2$ and $a^3$ in Figure 4.

The pulses appearing at the points X and Y in Figure 1 are fed to the respective control electrodes of a pair of push-pull connected valves 19 and 20 through condensers 21 and 22 and leak resistances 23 and 24. The anodes of the valves 19 and 20 are connected through resistances 25 and 26 to the source of anode current, whilst the cathodes of the two valves are connected together and to earth via a common cathode resistance 27.

The valve 20 is arranged so that in the absence of applied pulses it is fully conducting. If a derived pulse $a^3$ of large amplitude is applied to the valve 19 the cathode of the valve 19 falls in potential due to cathode follower action and the cathode of the valve 20 likewise falls in potential and since there is applied to the control electrode of the valve 20 the series of pulses $b'$, $c'$ and $d'$, but of smaller amplitude than that of the pulses $a^3$ which appear at the cathode of the valve 20, the cathode of the latter valve falls in potential more negatively than the negative fall of potential of its control electrode which tends to cause an increase of current in the valve 20, but since the valve 20 is normally fully conducting no change in anode current can occur. When, however, a pulse $a^2$ of smaller amplitude is applied to the valve 19 again causing a fall in potential of the cathode of that valve, the cathode potential of the valve 20 likewise falls, but since a pulse $a'$ is applied to the control electrode of the valve 20 of larger amplitude than the pulse $a^2$ appearing on the cathode, the anode current in the valve 20 is reduced so that a voltage variation is obtained in the anode circuit. Thus it can be arranged that the smaller amplitude derived pulses $a^2$ produce an output at the point 2 in Figure 1 of the form shown at $a^4$ in Figure 5, whilst the derived pulses $a^3$ of larger amplitude produce no output.

Although the circuit described above is designed mainly for separating a single pulse from a series of pulses, it will be understood that the circuit is equally applicable for the separation of a narrow pulse from a mixture of narrow and wide pulses. Furthermore, the circuit shown in Figure 1 may be arranged so that at the point Z an output of a series of pulses or an output of wide pulses is obtained. For this purpose the phases of the original and derived pulses would require to be changed and the valve 19 would be arranged to conduct only during the presence of a pulse $a^3$ although it may be preferable to substitute for the valves 19 and 20 a hexode valve to one control electrode of which the derived pulses are applied, whilst to another control electrode of which the pulses at the point Y are applied the derived pulses $a^2$ being of insufficient amplitude to render the valve conducting when a pulse $a'$ is present whilst the pulses $a^3$ are of sufficient amplitude to render the valve conducting when the pulses $b'$, $c'$, $d'$ are present. In both cases, amplitude limiting may be applied to the pulses $a^3$ and also to the pulses $a^3$ in the circuit shown in Figure 1.

The integrating circuit shown in Figure 1 is sensitive to the amplitude of the applied pulses, their width and their number. An alternative circuit for obtaining derived pulses of different amplitudes is shown in Figure 6 of the drawings, this circuit being sensitive to the amplitude of the applied pulses and their number but not to their width. In this circuit the resistance 17 is replaced by a condenser 28 which is connected in series with the cathode of a diode 29, the anode of the latter being connected through a condenser 30 which corresponds to the condenser 18 of Figure 1, to the positive terminal of the source of anode current. A resistance 31 is shunted across the condenser 30 and serves to discharge the condenser 30 within the repetition period of the pulses. A further diode 32 is provided, the anode of which is connected to the cathode of the diode 29, as shown, whilst the cathode of the diode 32 is connected to the source of anode current. On applying a pulse to the valve 7 in Figure 6, the anode potential of the valve falls and this fall of potential is transferred to the cathode of the diode 29 so that a charge proportional to the fall of potential is produced across the condenser 30 which charge leaks away through the resistance 31. When the pulse applied to the valve 7 ceases, the diode 32 becomes conducting and the charge which has developed across the condenser 28 commences to decay through the resistance 16 so that the cathode of the diode 29 falls negatively to an extent depending on the discharge of the condenser 28. If prior to the complete discharge of the condenser 28 a further pulse is applied to the valve 7, such as occurs if a series of pulses such as b, c and d is applied to the valve 7, a further charge is added to the condenser 30 so that the series of pulses produces across the condenser 30 a derived pulse of stepped formation having a maximum amplitude which is larger than the amplitude of the derived pulse obtained when only a single pulse is applied to the valve 7. The circuit shown in Figure 6 functions to produce a derived pulse the amplitude of which is only dependent on the number of applied pulses and not on their width.

Although the circuits described above are particularly suitable for use in aircraft detection apparatus, it will be understood that the circuits are capable of other uses.

We claim as our invention:

1. A pulse-separating circuit for separating single pulses and a series of pulses or for separating narrow and wide pulses comprising a main channel and an observing channel arranged to receive the pulses requiring separation, said main channel having means for delaying pulses fed therethrough and said observing channel having means comprising an integrating circuit to develop from narrow or single pulses derived pulses of smaller amplitude as compared with derived pulses developed by said last means from a wide pulse or a series of pulses, a control means to which both said delayed pulses and said derived pulses are applied, and means for causing said control means to pass said delayed pulses to an output circuit only in response to the application thereto of said smaller amplitude derived pulses.

2. The invention according to claim 1, wherein said control means includes a pair of valves having a common cathode impedance, said observing channel and said main channel including connections to supply the derived pulses and the delayed pulses, respectively, to the control electrodes, respectively, of said valves, the valve to which said derived pulses are applied being connected to function as a cathode follower, the other of said valves being biased so that when a derived pulse of large amplitude is developed there is no change in the anode current of said other valve due to the application of delayed pulses to said other valve, whilst there is a change in said anode current due to the application of delayed pulses when a derived pulse of comparatively small amplitude is developed whereby an output pulse is obtained.

3. A pulse-separating circuit for separating single pulses and a series of pulses independently of their relative widths according to claim 1 wherein said means in said observing channel comprises a unilateral-conducting device and a first storage device through which said pulses are fed to said unilaterally-conducting device, a second storage device, means for causing said unilateral-conducting device to conduct when a pulse is present in said observing channel and thereby cause a charge to be stored in said second storage device, and means including a second unilaterally-conducting device to discharge said first-mentioned storage device.

WALTER LESLIE WATTON.
ERIC WILLIAM BULL.
ERIC LAWRENCE CASLING WHITE.

REFERENCES CITED

The following references are of record in the file of this patent:

UNITED STATES PATENTS

| Number | Name | Date |
|---|---|---|
| 2,211,942 | White | Aug. 29, 1940 |
| 2,229,964 | Dome et al. | Jan. 28, 1941 |
| 2,281,934 | Geiger | May 5, 1942 |
| 2,338,395 | Bartelink | Jan. 4, 1944 |
| 2,359,447 | Seeley | Oct. 3, 1944 |
| 2,418,127 | Labin | Apr. 1, 1947 |
| 2,419,548 | Grieg | Apr. 29, 1947 |

FOREIGN PATENTS

| Number | Country | Date |
|---|---|---|
| 528,192 | Great Britain | Oct. 24, 1940 |